US008099559B2

(12) United States Patent
Choudhury et al.

(10) Patent No.: US 8,099,559 B2
(45) Date of Patent: Jan. 17, 2012

(54) SYSTEM AND METHOD FOR GENERATING FAST INSTRUCTION AND DATA INTERRUPTS FOR PROCESSOR DESIGN VERIFICATION AND VALIDATION

(75) Inventors: Shubhodeep Roy Choudhury, Karnataka (IN); Manoj Dusanapudi, Karnataka (IN); Sunil Suresh Hatti, Karnataka (IN); Shakti Kapoor, Austin, TX (US); Rahul Sharad Moharil, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 11/853,201

(22) Filed: Sep. 11, 2007

(65) Prior Publication Data

US 2009/0070546 A1 Mar. 12, 2009

(51) Int. Cl.
*G06F 12/00* (2006.01)
*G06F 13/00* (2006.01)
*G06F 13/28* (2006.01)

(52) U.S. Cl. .......................................... 711/144; 714/25
(58) Field of Classification Search .................. 711/144; 714/25
See application file for complete search history.

(56) References Cited

U.S. PATENT DOCUMENTS

| 4,800,486 A | 1/1989 | Horst | 364/200 |
|---|---|---|---|
| 4,910,663 A | 3/1990 | Bailey | 714/34 |
| 5,133,061 A | 7/1992 | Melton et al. | 711/128 |
| 5,182,811 A | 1/1993 | Sakamura | 710/264 |
| 5,202,889 A | 4/1993 | Aharon | 371/27 |
| 5,216,672 A | 6/1993 | Tatosian et al. | 714/718 |
| 5,218,703 A | 6/1993 | Fleck et al. | 710/264 |
| 5,331,643 A | 7/1994 | Smith | 714/728 |
| 5,396,619 A | 3/1995 | Walton | 714/8 |
| 5,426,750 A | 6/1995 | Becker et al. | 711/207 |
| 5,469,443 A | 11/1995 | Saxena | 714/720 |
| 5,475,822 A | 12/1995 | Sibigtroth et al. | 712/228 |
| 5,488,573 A | 1/1996 | Brown | 364/578 |

(Continued)

FOREIGN PATENT DOCUMENTS

JP 2000020341 A2 1/2000

(Continued)

OTHER PUBLICATIONS

Hubbard, PJ, "Memory Testing With Linear Feedback Shift Register," IBM Technical Disclosure Bulletin, 11-86 p. 2475, 1986.

(Continued)

*Primary Examiner* — Stephen Elmore
*Assistant Examiner* — Mark Giardino, Jr.
(74) *Attorney, Agent, or Firm* — VanLeeuwen & VanLeeuwen; Matthew B. Talpis

(57) ABSTRACT

A system and method for intentionally invaliding translation entry valid bits in order to provoke storage interrupts when executing a test case is presented. Prior to executing the test case, an interrupt handler pseudo-randomly invalidates a number of translation entries included in a translation lookaside buffer (TLB) by changing particular valid bits in order to provoke initial storage interrupts, such as an instruction storage interrupt (ISI) or a data storage interrupt (DSI). Once the processor executes the test case that, in turn, triggers a storage interrupt, the interrupt handler uses an index counter to validate particular valid bits and invalidate other valid bits, thus provoking subsequent storage interrupts. In one embodiment, the interrupt handler also changes valid bits in a page table when the processor executes in a mode that accesses the page table in addition to the TLB.

20 Claims, 6 Drawing Sheets

U.S. PATENT DOCUMENTS

| | | | | |
|---|---|---|---|---|
| 5,584,013 A | 12/1996 | Cheong et al. | ............... | 711/122 |
| 5,701,495 A | 12/1997 | Arndt et al. | ................... | 710/263 |
| 5,761,408 A | 6/1998 | Kolawa | ........................... | 714/38 |
| 5,784,550 A | 7/1998 | Brockmann et al. | ............ | 714/33 |
| 5,784,606 A | 7/1998 | Hoy et al. | ....................... | 714/33 |
| 5,784,698 A * | 7/1998 | Brady et al. | ................... | 711/171 |
| 5,815,696 A | 9/1998 | Tanaka et al. | ................ | 712/233 |
| 5,822,578 A | 10/1998 | Frank et al. | ................... | 712/244 |
| 5,996,097 A | 11/1999 | Evans et al. | ................... | 714/719 |
| 6,006,028 A | 12/1999 | Aharon et al. | ................. | 703/21 |
| 6,014,756 A | 1/2000 | Dottling et al. | ................ | 714/15 |
| 6,019,501 A | 2/2000 | Okazaki | ........................ | 714/718 |
| 6,070,218 A | 5/2000 | Giles et al. | .................... | 710/260 |
| 6,070,220 A | 5/2000 | Katayama | ..................... | 710/264 |
| 6,157,980 A | 12/2000 | Arimilli et al. | ................... | 711/3 |
| 6,167,479 A | 12/2000 | Hartnett et al. | .............. | 710/260 |
| 6,212,613 B1 * | 4/2001 | Belair | ........................... | 711/207 |
| 6,223,271 B1 | 4/2001 | Cepulis | ......................... | 711/206 |
| 6,223,337 B1 | 4/2001 | Blume | ............................. | 717/4 |
| 6,226,716 B1 | 5/2001 | Bauman et al. | ............... | 711/145 |
| 6,253,338 B1 | 6/2001 | Smolders | ........................ | 714/45 |
| 6,286,116 B1 | 9/2001 | Bhavsar | ......................... | 714/720 |
| 6,367,042 B1 | 4/2002 | Phan | ............................. | 714/733 |
| 6,381,715 B1 | 4/2002 | Baumann et al. | ............. | 714/718 |
| 6,609,216 B1 | 8/2003 | Almy et al. | ..................... | 714/25 |
| 6,662,297 B1 | 12/2003 | Boom et al. | ................... | 712/245 |
| 6,675,338 B1 | 1/2004 | Golshan | ......................... | 714/739 |
| 6,684,359 B2 | 1/2004 | Noy | ................................ | 714/741 |
| 6,694,461 B1 | 2/2004 | Treuer | ........................... | 714/719 |
| 6,701,461 B2 | 3/2004 | Oura | ............................. | 714/42 |
| 6,735,746 B2 | 5/2004 | Thompson et al. | ............ | 716/136 |
| 6,772,326 B2 | 8/2004 | Chauvel et al. | ................ | 712/244 |
| 6,865,501 B2 | 3/2005 | Huisman et al. | .............. | 702/117 |
| 6,920,416 B1 | 7/2005 | Swoboda et al. | .............. | 703/13 |
| 6,950,771 B1 | 9/2005 | Fan et al. | ....................... | 702/117 |
| 6,968,428 B2 | 11/2005 | Maly et al. | ...................... | 711/128 |
| 6,993,685 B2 | 1/2006 | Ramaswamy | ................... | 714/43 |
| 7,010,734 B2 | 3/2006 | Brahme | .......................... | 714/724 |
| 7,013,383 B2 | 3/2006 | Shelor | ............................ | 712/244 |
| 7,020,854 B2 | 3/2006 | Killian et al. | ..................... | 716/1 |
| 7,058,909 B2 | 6/2006 | Lu | ....................................... | 716/4 |
| 7,073,106 B2 | 7/2006 | Paredes | .......................... | 714/720 |
| 7,111,287 B2 | 9/2006 | Garvey et al. | ................. | 717/144 |
| 7,133,816 B2 | 11/2006 | Adir | ................................. | 703/14 |
| 7,222,179 B2 | 5/2007 | Srivastava et al. | ............ | 709/226 |
| 7,240,243 B2 | 7/2007 | Decker | ........................... | 714/33 |
| 7,356,436 B2 | 4/2008 | Bohizic et al. | ................ | 702/119 |
| 7,373,446 B2 | 5/2008 | Post et al. | ..................... | 710/261 |
| 7,536,694 B2 | 5/2009 | Blinick et al. | ................. | 719/310 |
| 7,669,083 B2 | 2/2010 | Arora et al. | ..................... | 714/25 |
| 7,752,499 B2 | 7/2010 | Choudhury et al. | ........... | 714/25 |
| 7,797,650 B2 | 9/2010 | Bag et al. | ........................... | 716/4 |
| 7,831,979 B2 | 11/2010 | Whalen | ........................ | 718/108 |
| 2001/0007970 A1 | 7/2001 | Kohno et al. | .................. | 702/117 |
| 2003/0097550 A1 | 5/2003 | Chauvel et al. | ............... | 712/244 |
| 2004/0143720 A1 | 7/2004 | Mansell et al. | ............... | 711/206 |
| 2004/0143819 A1 | 7/2004 | Cheng et al. | ................... | 717/125 |
| 2004/0268103 A1 | 12/2004 | Shelor | ............................ | 712/244 |
| 2005/0159925 A1 | 7/2005 | Gedamu | ......................... | 702/186 |
| 2005/0204231 A1 | 9/2005 | Mukherjee et al. | ........... | 714/733 |
| 2005/0210452 A1 | 9/2005 | Dimpsey et al. | .............. | 717/120 |
| 2005/0278702 A1 | 12/2005 | Koyfman et al. | .............. | 717/124 |
| 2006/0101181 A1 | 5/2006 | Post et al. | ..................... | 710/266 |
| 2006/0149952 A1 | 7/2006 | Blinick et al. | ................ | 712/244 |
| 2006/0161897 A1 | 7/2006 | Biberstein et al. | ............ | 717/124 |
| 2006/0195573 A1 | 8/2006 | Srivastava et al. | ............ | 709/224 |
| 2006/0212756 A1 | 9/2006 | Emek et al. | ..................... | 714/30 |
| 2006/0224863 A1 | 10/2006 | Lovett et al. | ................... | 712/215 |
| 2009/0070643 A1 | 3/2009 | Anvekar et al. | .............. | 714/718 |
| 2009/0300441 A1 | 12/2009 | Andreev et al. | .............. | 714/718 |

FOREIGN PATENT DOCUMENTS

TW         0440765 B         6/2001

OTHER PUBLICATIONS

Arimilli, et al., "High-Performance Combined Data/Address Memory Test," IBM Technical Disclosure, n7 12-90 p. 104-108, 1990.

* cited by examiner

_US 8,099,559 B2_

SYSTEM AND METHOD FOR GENERATING FAST INSTRUCTION AND DATA INTERRUPTS FOR PROCESSOR DESIGN VERIFICATION AND VALIDATION

BACKGROUND OF THE INVENTION

1. Technical Field

The present invention relates to a system and method for generating fast instruction and data interrupts for processor design verification and validation. More particularly, the present invention relates to a system and method for invalidating translation entry valid bits in order to provoke storage interrupts during test case execution.

2. Description of the Related Art

Processor testing tools exist whose goal is to generate the most stressful test case for a processor. In theory, the generated test case should provide maximum test coverage and should be interesting enough to stress various timing scenarios on the processor. The whole technology of these tools sits in the logic of building these test cases.

One aspect of design verification and validation is testing interrupt logic in conjunction with address translation table arrays and parity checks, such as with a translation lookaside buffer (TLB). A TLB includes translation entries for translating virtual addresses to real addresses. Each translation entry includes a "valid bit" that indicates whether the entry's translation is actually valid.

Verifying and validating a processor using test cases typically includes three stages, which are 1) test case build stage, 2) test case execution stage, and 3) validation and verification stage. A challenge found is generating a sufficient amount of interrupts to test the interrupt logic in conjunction with address translation table arrays and parity checks regardless of the test case itself. Instead, existing art generates a large amount of individual test cases that are tailored to test the interrupt logic in conjunction with address translation table arrays and parity checks. This approach requires a significant amount of upfront build time, which reduces overall testing time.

What is needed, therefore, is a system and method for generating a large amount of interrupts, independent of a test case under execution, to sufficiently test a processor's interrupt logic in conjunction with address translation table arrays and parity checks.

SUMMARY

It has been discovered that the aforementioned challenges are resolved using a system and method for intentionally invalidating translation entry valid bits in order to provoke storage interrupts when executing a test case. Prior to executing the test case for the first time, a processor loads various translation entries, whose "valid bits" are initially invalidated, in order to provoke initial storage interrupts, such as an instruction storage interrupt (ISI) or a data storage interrupt (DSI). Once the processor executes the test case that, in turn, triggers a storage interrupt, an interrupt handler uses an index counter to validate particular valid bits and invalidate other valid bits, thus provoking subsequent storage interrupts. In addition, the invention described herein does not require building intelligence inside the test case.

A test case generator generates a test case and provides the test case to a test case executor. In turn, the test case executor's scheduler pseudo-randomly invalidates a number of translation entries by changing their corresponding valid bit values, and dispatches the test case to a processor. The processor loads the test case, and also loads translation entries included in the TLB with address translations (e.g., virtual address to real address translations). In addition, the processor's interrupt handler resets an index counter to zero, which is used to return to the TLB's first translation entry location once the end of the TLB array is reached.

The processor commences executing the test case and, when a particular translation is not available (i.e. invalidated), the processor generates a storage interrupt. In turn, the interrupt handler retrieves the index counter's value and begins to validate a particular number of entries in the TLB, starting at the translation entry that corresponds to the index counter value (e.g., the first and second translation entry). Next, the interrupt handler invalidates other translation entries in order to provoke subsequent storage interrupts (e.g., the third and fourth translation entry).

Once the interrupt handler validates and invalidates the translation entries by changing their valid bits, the interrupt handler increments the index counter accordingly (e.g., to the fifth translation entry) and passes control back to the processor to continue executing the test case. When the index counter reaches the last translation entry in the TLB, the interrupt handler resets the index counter back to zero.

In one embodiment, the interrupt handler also changes valid bits in a page table when the processor executes in a mode that accesses the page table in addition to the TLB. In this embodiment, when there is an address translation miss in the TLB, the processor accesses the page table and, if there is an address translation miss in the page table, a storage interrupt is generated. The interrupt handler receives the storage interrupt and validates/invalidates valid entry bits in the page table accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
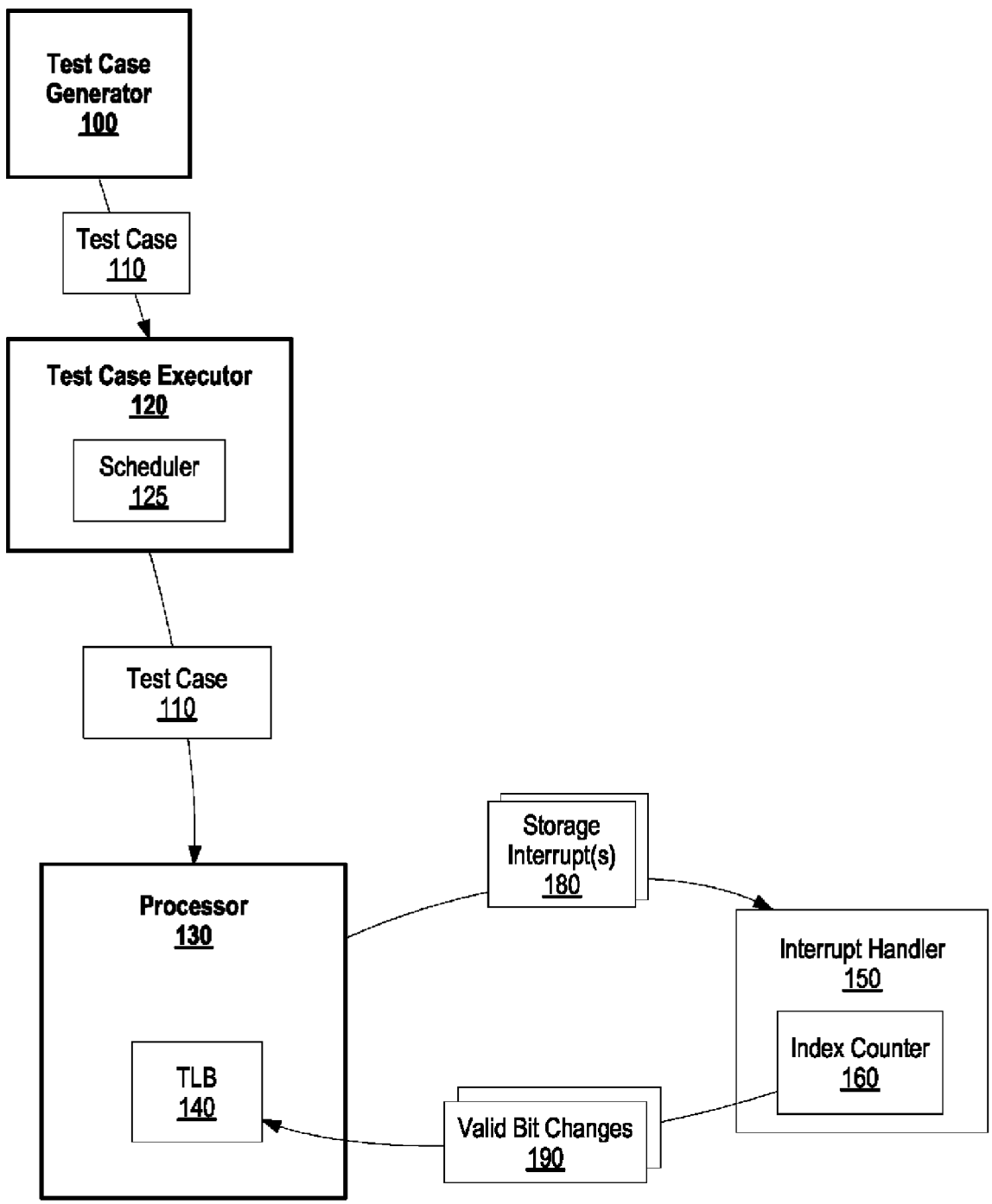
FIG. 1 is a diagram showing an interrupt handler intentionally invalidating translation entries in order to cause subsequent storage interrupts.

FIG. 1 is a diagram showing an interrupt handler intentionally invalidating translation entries in order to cause subsequent storage interrupts. Test case generator 100 generates test case 110 and provides test case 110 to test case executor 120. Test case executor 120 includes scheduler 125, which pseudo-randomly invalidates a number of translation entries by changing valid bit values that correspond to particular translation entries. Test case executor 120 then dispatches test case 110 to processor 130. Processor 130 loads test case 110 and, during the loading process, loads translation entries in translation lookaside buffer (TLB) 140 with address translations (e.g., virtual address to real address translations). At this point, some translation entries include invalid valid bit values, which resulted from scheduler 125 initially changing their values.

Processor 130 commences executing test case 110 and, when test case 110 requires an instruction address translation or data address translation in TLB 140 that has been invalidated, processor 130 generates storage interrupt 180 and jumps to interrupt handler 150. Interrupt handler 150 includes an index pointer that points to a particular entry in TLB 140. Interrupt handler 150 retrieves the index counter value included in index counter 160, and begins to validate a particular number of valid bits in TLB 140 (valid bit changes 190). For example, if index counter 160 points to the first translation entry, interrupt handler may validate the first and second translation entry. Next, interrupt handler 150 invalidates other translation entries in order to create subsequent storage interrupts. Using the example described above, interrupt handler invalidates the third and fourth translation entry via valid bit changes 190.

Once interrupt handler 150 validates and invalidates the valid bits, interrupt handler 150 increments index counter 160 accordingly (e.g., to the fifth translation entry) and processing exits interrupt handler 150 to continue executing test case 110. When index counter 160 corresponds to the last translation entry in TLB 140, interrupt handler 150 resets index counter 160 back to zero.

In one embodiment, interrupt handler 150 also changes valid bits in a page table when processor 130 executes in a mode that accesses the page table in addition to TLB 140.

Figure 2A:
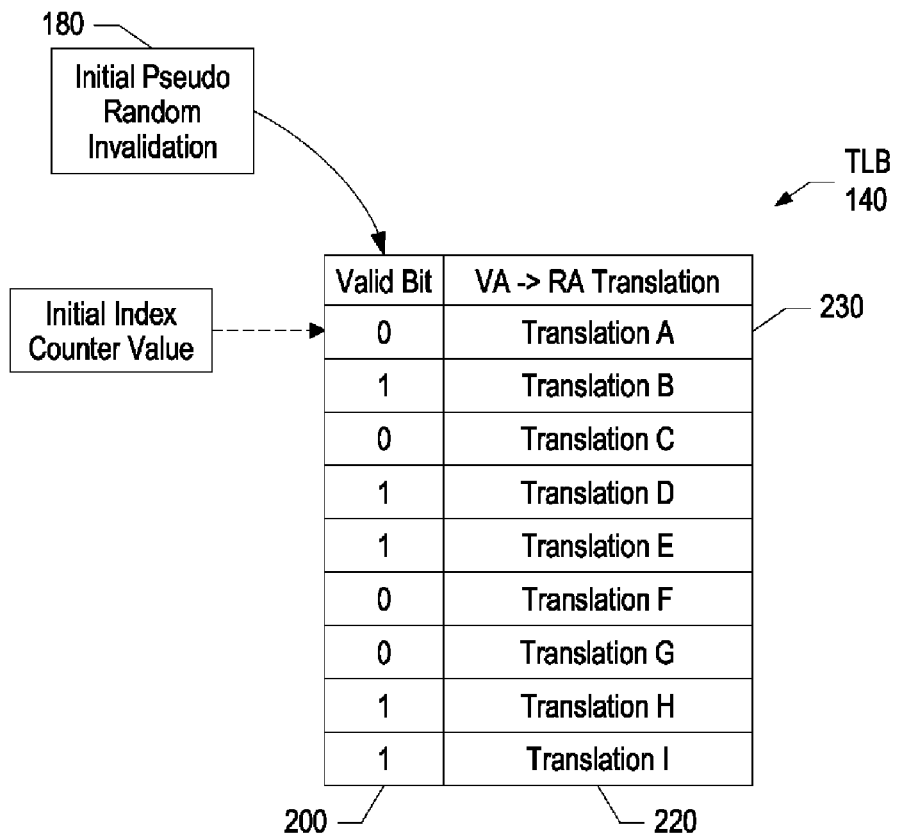
FIG. 2A is a diagram showing an address translation table that includes invalid translation entries.

FIG. 2A is a diagram showing an address translation table that includes invalid translation entries. A processor loads translation lookaside buffer 140 with translations (column 220) and initially sets their corresponding valid bit values to true (column 200), indicating that the particular translations are valid. Once TLB 140 is loaded, a scheduler pseudo-randomly invalidates some of the valid bits (initial pseudo-random invalidation 180) in order to cause storage interrupts while executing a test case. Later, during execution, the interrupt handler takes care of validating and invalidating the entries. As such, when the test case attempts to access a translation entry that is invalidated, a storage interrupt occurs and the processor jumps to the interrupt handler. In addition, the interrupt handler resets an index counter value that, in turn, points to translation entry 230. Once the test case begins executing and interrupts occur, the interrupt handler uses the index counter value as a starting point for validating and invalidating translation entries by changing the corresponding valid bits (see FIG. 2B and corresponding text for further details).

Figure 2B:
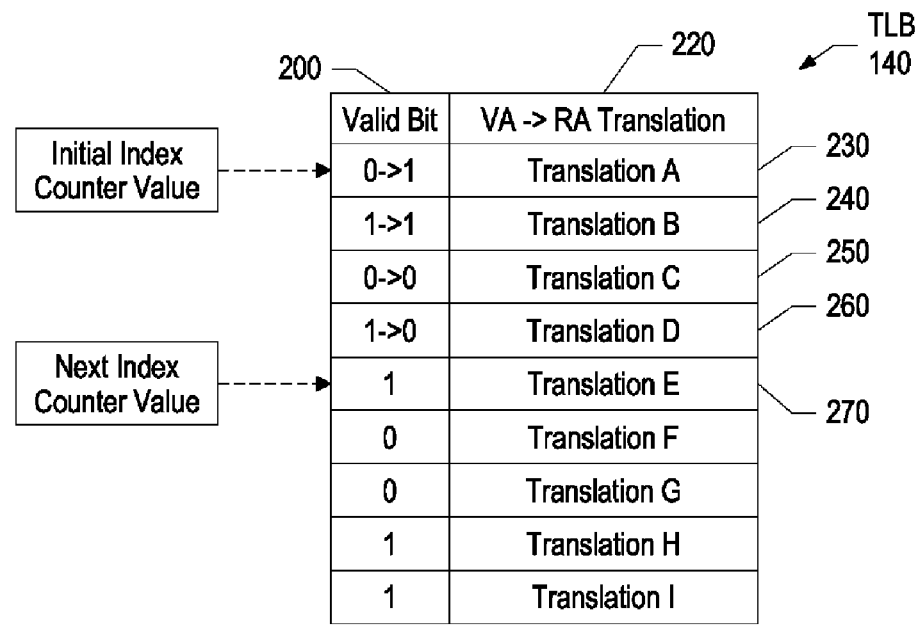
FIG. 2B is a diagram showing an interrupt handler using an index counter value as a starting point for validating and invalidating translation entries.

FIG. 2B is a diagram showing an interrupt handler using an index counter value as a starting point for validating and invalidating translation entries. When an interrupt handler receives a storage interrupt, such as an instruction storage interrupt (ISI) or a data storage interrupt (DSI), the interrupt handler retrieves an index counter value that points to a particular translation entry, such as translation entry 230 shown in FIG. 2B. The interrupt handler proceeds to validate a number of valid bits (column 200), such as translation entries 230-240. The interrupt handler then invalidates a few subsequent valid bits, such as translation entries 250-260, which causes subsequent storage interrupts to generate when a test case requires a corresponding translation. Translation entries 230-260 are validated/invalidated before the next test case instruction executes.

Figure 3:
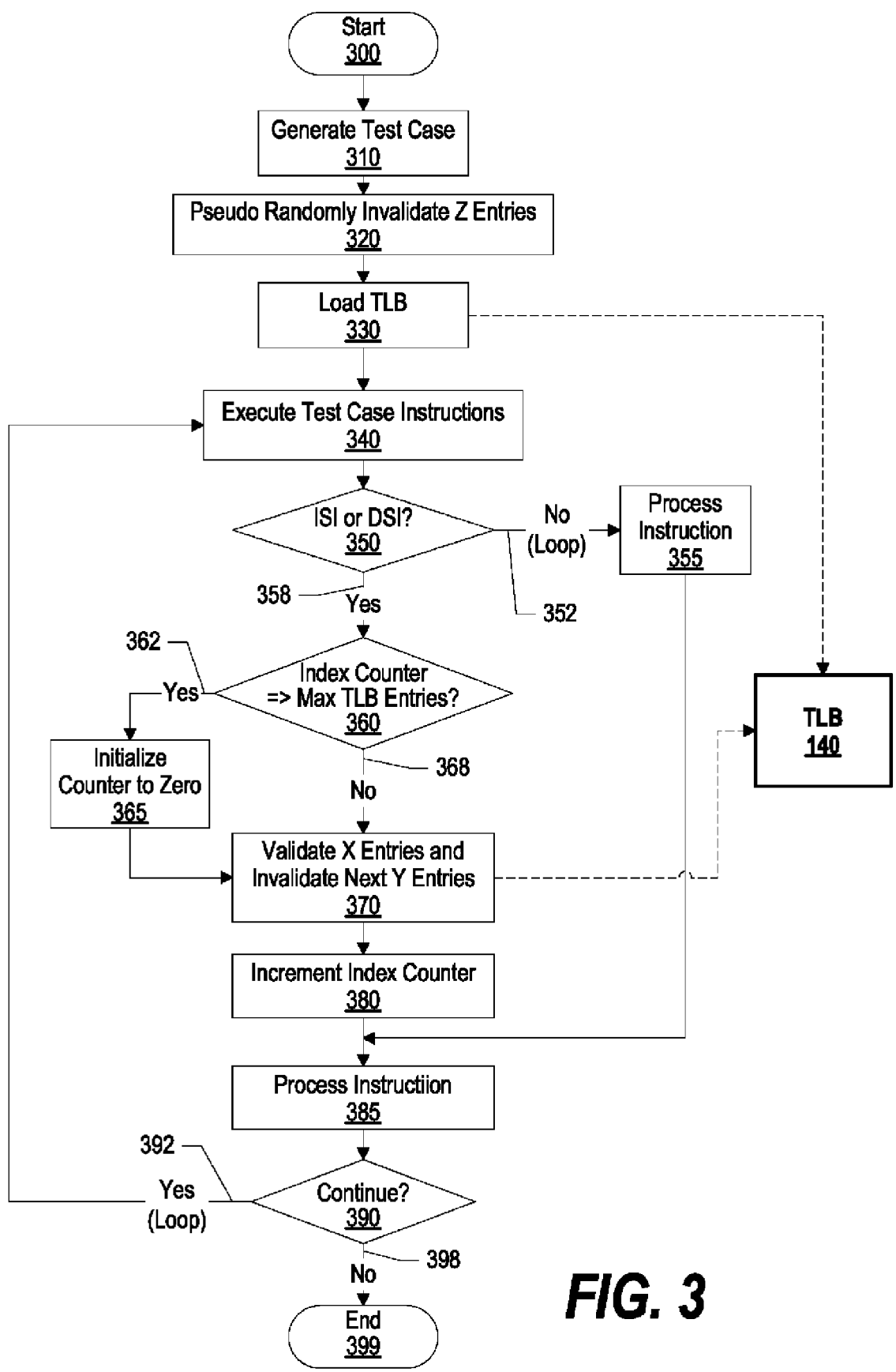
FIG. 3 is a flowchart showing steps taken in creating a large number of storage interrupts in order to test a processor's interrupt logic.

Once the interrupt handler validates and invalidates a number of valid bits, the interrupt handler increments the index counter value accordingly to point to the next translation entry, such as translation entry 270 (see FIG. 3 and corresponding text for further details). As one skilled in the art can appreciate, more or less bits may be validated/invalidated between instruction executions than what is shown in FIG. 2B.

FIG. 3 is a flowchart showing steps taken in creating a large number of storage interrupts in order to test a processor's interrupt logic. Processing commences at 300, whereupon processing generates a test case at step 310. At step 320, processing pseudo-randomly invalidates one or more translation entries included in an address translation table in order to provoke address translation interrupts (see FIG. 2A and corresponding text for further details). The address translations are used to translate one address type to a different address type, such as a virtual address to a real address. At step 330, processing loads the address translation table that includes various invalid valid bits into translation lookaside buffer (TLB) 140. TLB 140 is the same as that shown in FIG. 1.

Next, at step 340, processing executes the test case. During the execution, a determination is made as to whether the test case triggered a storage interrupt (ISI interrupt or DSI interrupt) (decision 350). This occurs when the test case requires an instruction address translation or a data address translation that resides in an invalid translation entry. If a storage interrupt has not occurred, decision 350 branches to "No" branch 352 whereupon processing processes the instruction (step 355). On the other hand, if the instruction is an ISI or DSI interrupt, decision 350 branches to "Yes" branch 358.

A determination is made as to whether an index counter, which points to a translation entry included in TLB 140, has reached the last translation entry in TLB 140 (decision 360). If the index counter has reached the last translation entry, decision 360 branches to "Yes" branch 362, whereupon processing initializes the index counter to zero (first translation entry) at step 365. On the other hand, if the index counter has not reached the last translation entry, decision 360 branches to "No" branch 368, bypassing index counter initialization step 365.

At step 370, processing validates a number of translation entries in TLB 140, and invalidates other translation entries (see FIG. 2B and corresponding text for further details). This is done in order to provoke subsequent storage interrupts when the test case executes. For example, processing may validate the first four translation entries starting with the translation entry for which the index counter value corresponds, and invalidate the fifth through eighth translation entry.

Processing increments the index counter at step 380. Using the example described above, processing increments the index counter by nine in order to point to the ninth translation entry for the next interrupt. A determination is made as to whether to continue executing the test case, such as after all the instructions in the test case have been executed (decision 390). If processing should continue, decision 390 branches to "Yes" branch 392, which loops back to continue to execute instructions and process storage interrupts. This looping continues until processing should terminate, at which point decision 390 branches to "No" branch 398 whereupon processing ends at 399.

Figure 4:
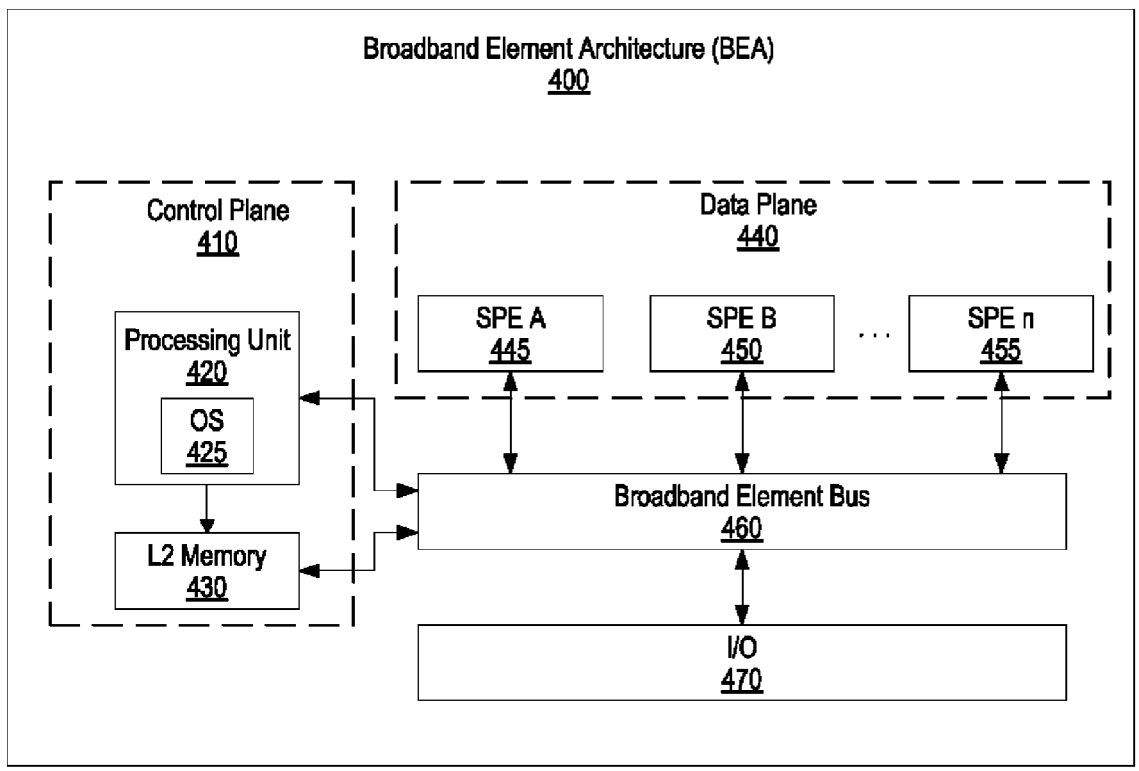
FIG. 4 is a diagram showing a broadband element architecture, which includes a plurality of heterogeneous processors capable of implementing the invention described herein.

FIG. 4 is a diagram showing a broadband element architecture, which includes a plurality of heterogeneous processors capable of implementing the invention described herein. The heterogeneous processors share a common memory and a common bus. Broadband element architecture (BEA) 400 sends and receives information to/from external devices through input output 470, and distributes the information to control plane 410 and data plane 440 using processor element bus 460. Control plane 410 manages BEA 400 and distributes work to data plane 440.

Control plane 410 includes processing unit 420 which runs operating system (OS) 425. For example, processing unit 420 may be a Power PC core that is embedded in BEA 400 and OS 425 may be a Linux operating system. Processing unit 420 manages a common memory map table for BEA 400. The memory map table corresponds to memory locations included in BEA 400, such as L2 memory 430 as well as non-private memory included in data plane 440.

Data plane 440 includes Synergistic processing element's (SPE) 445, 450, and 455. Each SPE is used to process data information and each SPE may have different instruction sets. For example, BEA 400 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPU) which is a processing core, such as a digital signal processor, a microcontroller, a microprocessor, or a combination of these cores.

SPE 445, 450, and 455 are connected to processor element bus 460, which passes information between control plane 410, data plane 440, and input/output 470. Bus 460 is an on-chip coherent multi-processor bus that passes information between I/O 470, control plane 410, and data plane 440. Input/output 470 includes flexible input-output logic which dynamically assigns interface pins to input output controllers based upon peripheral devices that are connected to BEA 400.

Figure 5:
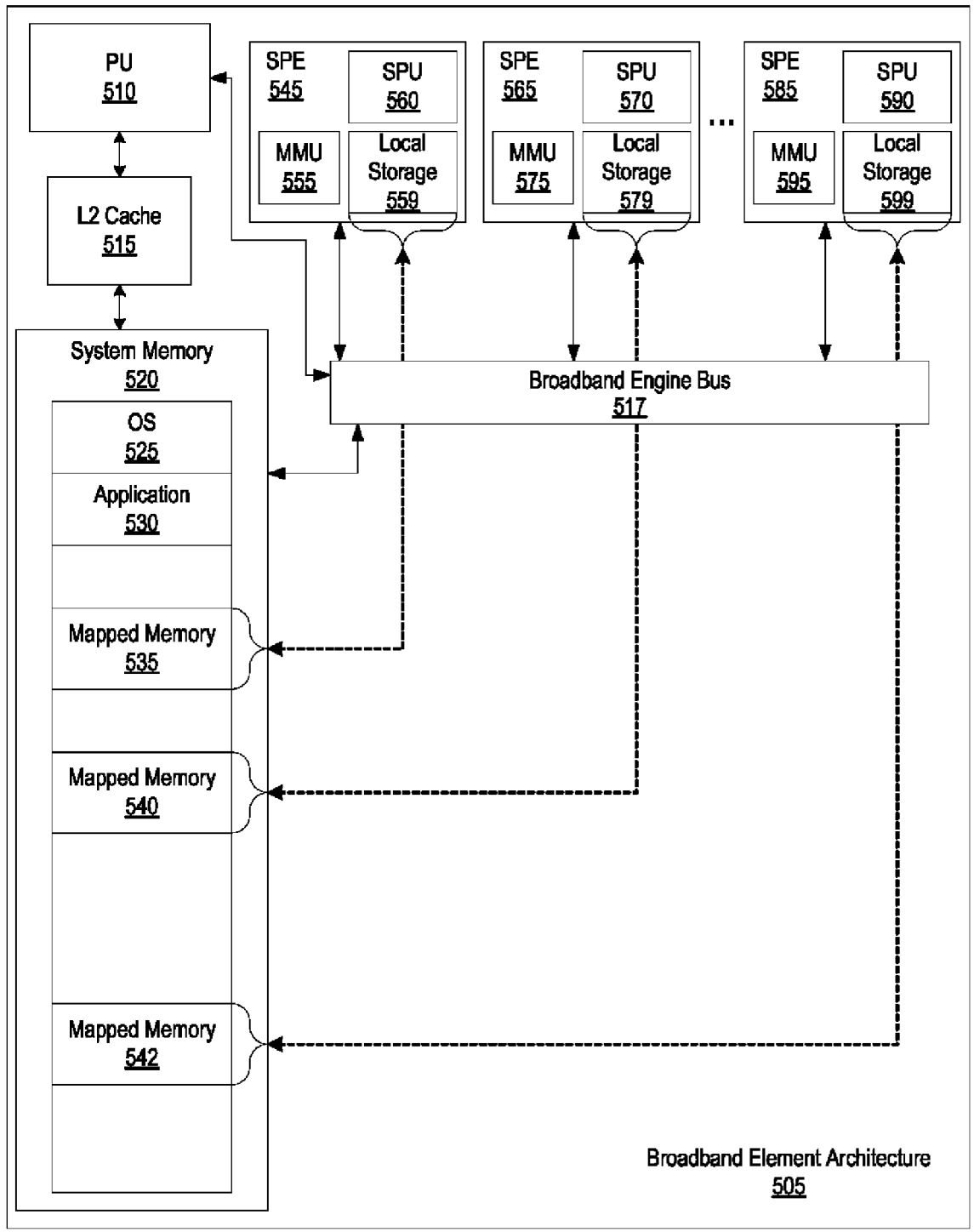
FIG. 5 is a block diagram illustrating a processing element having a main processor and a plurality of secondary processors sharing a system memory.

FIG. 5 is a block diagram illustrating a processing element having a main processor and a plurality of secondary processors sharing a system memory. Broadband Element Architecture (BEA) 505 includes processing unit (PU) 510, which, in one embodiment, acts as the main processor and runs the operating system. Processing unit 510 may be, for example, a Power PC core executing a Linux operating system. BEA 505 also includes a plurality of synergistic processing elements (SPEs) such as SPEs 545 through 585. Each SPE includes a synergistic processing unit (SPU) that act as secondary processing units to PU 510, a memory storage unit, and local storage. For example, SPE 545 includes SPU 560, MMU 555, and local storage 559; SPE 565 includes SPU 570, MMU 575, and local storage 579; and SPE 585 includes SPU 590, MMU 595, and local storage 599.

In one embodiment, the SPEs process data under the control of PU 510. The SPEs may be, for example, digital signal processing cores, microprocessor cores, micro controller cores, etc., or a combination of the above cores. In one embodiment, each one of the local stores is a storage area associated with a particular SPU. Each SPU can configure its local store as a private storage area, a shared storage area, or an SPU's local store may be partly private and partly shared.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 510 and by the other SPEs. An SPU may reserve part of its local store in order for the SPU to have fast, guaranteed access to some memory when performing tasks that require such fast access. The SPU may also reserve some of its local store as private when processing sensitive data, as is the case, for example, when the SPU is performing encryption/decryption.

The MMUs are responsible for transferring data between an SPU's local store and the system memory. In one embodiment, an MMU includes a direct memory access (DMA) controller configured to perform this function.

Each SPE may be set up to perform a different task, and accordingly, in one embodiment, each SPE may be accessed using different instruction sets. If BEA 505 is being used in a wireless communications system, for example, each SPE may be responsible for separate processing tasks, such as modulation, chip rate processing, encoding, network interfacing, etc. In another embodiment, each SPE may have identical instruction sets and may be used in parallel to perform operations benefiting from parallel processes.

The shared portion of the SPEs' local stores may be accessed by PU 510 as well as by the other SPEs by mapping each shared region to system memory 520. In one embodiment, PU 510 manages the memory map for the common system memory 520. The memory map table may include PU 510's L2 Cache 515, system memory 520, as well as the SPEs' shared local stores.

A portion of system memory 520 as shown is occupied by the operating system (OS 525). System Memory 525 also contains data 540, which represents data to be processed by SPU 510 as well as by the SPEs. In one embodiment, a process executing on the PU receives a request for a task involving the processing of large data. The PU first determines an optimum method for performing the task as well as an optimum placement of the data in common system memory 520. The PU may then initiate a transfer of the data to be processed from disk 535 to system memory 520. In one embodiment, the PU arranges the data in system memory 525 in data blocks the size of the registers of the SPEs. In one embodiment, the SPEs may have 128 registers, each register being 128 bits long.

The PU then searches for available SPEs and assigns blocks of data to any available SPEs for processing of the data. The SPEs can access the common system memory (through a DMA command, for example) transfer the data to the SPEs' local store, and perform the assigned operations. After processing the data, the SPEs may transfer the data (using DMA again, for example) back to common system memory 520. This procedure may be repeated as SPEs become available until all the data blocks have been processed.

Figure 6:
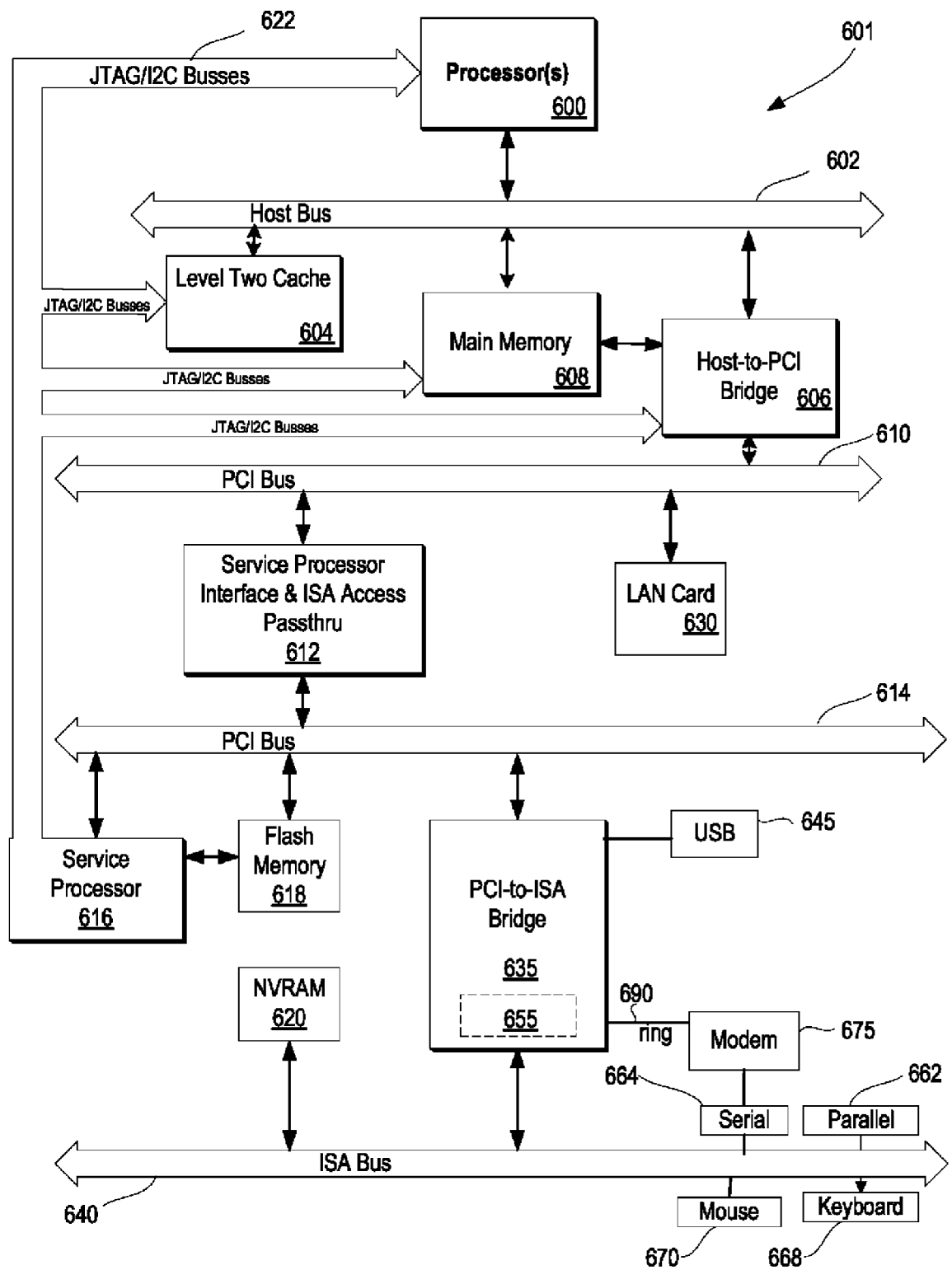
FIG. 6 is a block diagram of a computing device capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 665 is connected to serial port 664 and PCI-to-ISA Bridge 635.

While FIG. 6 shows one information handling system that employs processor(s) 600, the information handling system may take many forms. For example, information handling system 601 may take the form of a desktop, server, portable, laptop, notebook, or other form factor computer or data processing system. Information handling system 601 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    loading each of a plurality of translation entries in an address translation table, wherein each of the plurality of translation entries includes an address translation and a valid bit;
    pseudo-randomly invalidating one or more of the valid bits, which results in invalidating a first translation entry included in a plurality of translation entries in order to provoke a storage interrupt;
    detecting the storage interrupt corresponding to the first translation entry;
    in response to detecting the storage interrupt, retrieving an index counter value that corresponds to a second translation entry included in the plurality of translation entries in the address translation table, wherein the second translation entry is not associated with the storage interrupt;
    changing a valid bit value included in the second translation entry; and
    storing the changed valid bit value in the second translation entry.

2. The method of claim 1 wherein the changing of the valid bit value results in invalidating the second translation entry.

3. The method of claim 1 wherein, prior to detecting the interrupt, the method further comprises:
    executing an instruction that requires the first translation entry; and
    generating the storage interrupt based upon the instruction requiring the first translation entry and the first translation entry being invalid.

4. The method of claim 3 wherein, prior to executing a subsequent instruction, the method further comprises:
   validating one or more of the plurality of translation entries; and
   invalidating one or more of the plurality of translation entries.

5. The method of claim 1 further comprising:
   determining that the index counter value has reached a maximum value that corresponds to a last translation entry included in the address translation table, the last translation entry include in the plurality of translation entries; and
   in response to determining that the index counter value has reached a maximum value, resetting the index counter value.

6. The method of claim 1 wherein the storage interrupt is selected from the group consisting of an instruction storage interrupt and a data storage interrupt.

7. The method of claim 1 wherein the address translation table is selected from the group consisting of a translation lookaside buffer and a page table.

8. An information handling system comprising:
   one or more processors;
   a memory accessible by the processors;
   one or more nonvolatile storage devices accessible by the processors; and
   a set of instructions stored in the memory, wherein one or more of the processors executes the set of instructions in order to perform actions of:
      loading each of a plurality of translation entries in an address translation table, wherein each of the plurality of translation entries includes an address translation and a valid bit;
      pseudo-randomly invalidating one or more of the valid bits, which results in invalidating a first translation entry included in a plurality of translation entries in order to provoke a storage interrupt;
      detecting the storage interrupt corresponding to the first translation entry;
      in response to detecting the storage interrupt, retrieving an index counter value that corresponds to a second translation entry included in the plurality of translation entries in the address translation table, wherein the second translation entry is not associated with the storage interrupt;
      changing a valid bit value included in the second translation entry; and
      storing the changed valid bit value in the second translation entry.

9. The information handling system of claim 8 wherein the changing of the valid bit value results in invalidating the second translation entry.

10. The information handling system of claim 8 wherein, prior to detecting the interrupt, further comprising an additional set of instructions in order to perform actions of:
   executing an instruction that requires the first translation entry; and
   generating the storage interrupt based upon the instruction requiring the first translation entry and the first translation entry being invalid.

11. The information handling system of claim 10 wherein, prior to executing a subsequent instruction, further comprising an additional set of instructions in order to perform actions of:
   validating one or more of the plurality of translation entries; and
   invalidating one or more of the plurality of translation entries.

12. The information handling system of claim 8 further comprising an additional set of instructions in order to perform actions of:
   determining that the index counter value has reached a maximum value that corresponds to a last translation entry included in the address translation table, the last translation entry include in the plurality of translation entries; and
   in response to determining that the index counter value has reached a maximum value, resetting the index counter value.

13. The information handling system of claim 8 wherein the storage interrupt is selected from the group consisting of an instruction storage interrupt and a data storage interrupt.

14. A computer program product stored on a computer operable media, the computer operable media containing instructions for execution by a computer, which, when executed by the computer, cause the computer to implement a method of processing test patterns, the method comprising:
   loading each of a plurality of translation entries in an address translation table, wherein each of the plurality of translation entries includes an address translation and a valid bit;
   pseudo-randomly invalidating one or more of the valid bits, which results in invalidating a first translation entry included in a plurality of translation entries in order to provoke a storage interrupt;
   detecting the storage interrupt corresponding to the first translation entry;
   in response to detecting the storage interrupt, retrieving an index counter value that corresponds to a second translation entry included in the plurality of translation entries in the address translation table, wherein the second translation entry is not associated with the storage interrupt;
   changing a valid bit value included in the second translation entry; and
   storing the changed valid bit value in the second translation entry.

15. The computer program product of claim 14 wherein the changing of the valid bit value results in invalidating the second translation entry.

16. The computer program product of claim 14 wherein, prior to detecting the interrupt, the method further comprises:
   executing an instruction that requires the first translation entry; and
   generating the storage interrupt based upon the instruction requiring the first translation entry and the first translation entry being invalid.

17. The computer program product of claim 16 wherein, prior to executing a subsequent instruction, the method further comprises:
   validating one or more of the plurality of translation entries; and
   invalidating one or more of the plurality of translation entries.

18. The computer program product of claim 14 wherein the method further comprises:
   determining that the index counter value has reached a maximum value that corresponds to a last translation entry included in the address translation table, the last translation entry include in the plurality of translation entries; and in response to determining that the index counter value has reached a maximum value, resetting the index counter value.

19. The computer program product of claim 14 wherein the storage interrupt is selected from the group consisting of an instruction storage interrupt and a data storage interrupt.

20. The computer program product of claim 14 wherein the address translation table is selected from the group consisting of a translation lookaside buffer and a page table.

* * * * *